United States Patent Office 3,286,691
Patented Nov. 22, 1966

3,286,691
ODOR AND LIQUID ABSORBING ANIMAL LITTER
AND METHOD OF PREPARING SAME
Arnett R. McFadden, 2519 W. 90th, Leawood, Kans.
No Drawing. Filed Dec. 23, 1964, Ser. No. 420,781
9 Claims. (Cl. 119—1)

This invention relates to a composition for use as an animal litter, and also to a process for treatment of animal waste.

It is the primary object of my invention to provide a composition and process for treatment of fresh animal waste wherein the waste product is mixed with a special particulate or granulated material to facilitate handling of the waste and to render the latter relatively odorless, dry and camouflaged.

Previous animal litter techniques have generally employed moisture-absorbent clay materials or fibrous products to serve to keep the animal waste in a relatively dry condition before disposal thereof. Although these compositions are suitable as drying agents, they have many disadvantages which may be obviated by using my waste treatment composition and process.

It is, therefore, an important object of the present invention to provide a composition and process for treating fresh animal waste wherein said waste is mixed with a particulate material, which material affords excellent moisture absorption properties in combination with the inherent advantage of deodorization of the waste. Materials found to be particularly adapted for use in my invention are dehydrated grasses. Grasses, in the broader terminology to be used herein, include not only the true botanical grasses, but also such plants often referred to as "artificial grasses" which include such plants as legumes. As will be more fully explained hereinafter, the legume alfalfa is a highly satisfactory artificial grass to be employed for my process.

It is a further object of this invention to provide an animal litter of the aforementioned character wherein animal litter of the aforementioned character wherein the specialized particulate material has a relatively dark color, which color camouflages the waste material mixed therewith to obviate the attendant unsightly disadvantages associated with previous litter methods. In general, the clay and fibrous materials previously employed are light in color and afford no disguising or masking properties.

It is yet another object of the instant invention to provide a composition and process as above described wherein the particulate material includes an organic, naturally grown product having chlorophyl therein whereby the material absorbs nauseating waste odors while at the same time has its own natural odor which is an attraction to animals.

An aim of this invention is to provide an animal litter wherein the economical advantages of the same are noteworthy and include such factors as low initial product cost, relatively long-lasting use before changing, and use of the spent material as lawn fertilizer.

A further aim of the present invention is to provide a composition and process wherein is utilized a dehydrated, particulate grass in combination with additive compounds to further enhance the advantages of my invention.

My composition and process employs a particulate material which treats animal waste, which material is preferably a dehydrated grass product. As stated above, the term "grasses" includes artificial grasses as well as the true botanical grasses. Development work has shown that dehydrated alfalfa is particularly suitable when used pursuant to the teachings of my invention. Other organic, naturally grown products having chlorophyl therein have advantages similar to that shown by the legume alfalfa.

Alfalfa is commonly obtained in pelletized form, and for best utilization as an animal litter is reduced to granulated particles by a grinding operation. The processing step of converting pelletized alfalfa to granulated alfalfa is conveniently accomplished by running the material through a roller mill. The material then passes through sifters for sizing.

The processing operation also includes dehydration of the alfalfa so as to enhance the moisture absorbent properties thereof. The drying operation may be suitably performed by any one of a number of conventional methods. After the grinding and drying operations the dehydrated alfalfa is placed in a convenient location in a barn or home and made easily accessible to the animal.

When animal waste is deposited on the dehydrated alfalfa it will immediately be de-moisturized due to the high absorbent qualities of the alfalfa to thereby render the waste relatively dry to facilitate the handling thereof when it is desired to remove the same from the barn or home. Previous animal treatment compositions have also served as drying agents but have failed to provide additional advantages as set forth hereinafter.

Alfalfa, being an organic, naturally grown product having chlorophyl therein, also serves as a deodorizer of the animal waste mixed therewith. This advantage is, of course, not offered by most clay and fibrous materials and is, therefore, considered to be an important contribution to the field of animal waste treatment.

Yet another advantage of using dehydrated alfalfa is the utilization of its inherent masking properties whereby dark waste material will be camouflaged when deposited in a particulate dehydrated alfalfa provided in the barn or home. Of course, other animal litter compositions may be dyed to render them dark in character whereby they may camouflage animal waste mixed therewith, but this is an additional processing step not necessary when utilizing animal litter made pursuant to the teachings of this invention. Therefore, a combination of advantages is obtained by use of only a single material, which material is preferably dehydrated alfalfa, but may also comprise similar grasses or legumes. It is also noteworthy that the material is nonharmful when consumed by the animal. In fact, dehydrated alfalfa and similar organic, naturally grown products are palatable and healthful when eaten by some animals. This is particularly true with respect to cattle and other livestock. Clay and fibrous materials on the other hand, may possibly cause harmful effects when consumed by an animal and they are, of course, nonpalatable.

Due to the high moisture absorption characteristics of dehydrated grasses, it may remain in use for a prolonged period of time before changing is necessary. This, of course, results in a saving of both time and expense. A further economical factor is that the material to be discarded is suitable for use as a lawn fertilizer as such spent material includes the primary fertilizer ingredients. Previously used animal litter compositions could, of course, not be used for fertilizing operations.

Advantages of my animal litter composition may be further enhanced by admixing the dehydrated alfalfa with such materials as sodium or calcium bentonite and 6 - ethoxy-1,2-dihydro-2,2,4-trimethylquinoline. Sodium and calcium bentonites, as well as other alkali metal bentonites, aid in absorbing moisture to thereby prolong the usefulness of the animal litter composition. Sodium bentonite, for example, absorbs approximately twenty times its own weight in water. The proportion of bentonite in the animal litter composition preferably ranges from ½ to 25 percent. The bentonite may be added in dry form and mixed with the dehydrated alfalfa by any suitable method. It may also be added along with water whereby a slurry of bentonite and alfalfa are formed, the slurry being completely mixed and then dried until suitable for use.

6-ethoxy-1,2-dihydro-2,2,4-trimethylquinoline is an oxygen-consuming material and serves to stabilize the product formed upon admixing the particulate material with animal waste. This additive is provided in relatively small proportions.

It is anticipated that the primary application of my invention is to provide an animal litter for use with domestic animals, such as cats, which are kept in the home. In this regard, a quantity of dehydrated alfalfa, with or without additive compounds, would ordinarily be placed in a receptacle which is readily accessible to the animal. For best results, the particle size of the granulated alfalfa is of a critical nature. The size range found most successful has been $1/16$ to $1/4$ inch. It is well known that a cat, after depositing waste material, desires to cover up the same. This covering function is relatively difficult when the particle size of the animal litter composition is over $1/4$ inch. Thus, to encourage the use of the animal litter, it is preferable to use a particle size which may easily be pawed about by the cat when covering the waste. Particles less than $1/16$ inch in size are too fine and thus may adhere to the cat and subsequently be tracked around the house.

A further inherent advantage of dehydrated alfalfa with respect to the covering function is the low density property of the material. This light weight makes the covering function easier for the cat.

The animal litter composition and process disclosed herein is also applicable to other domestic animals and many types of livestock. The particular specifications of the particulate material would necessarily be governed by the individual animal. Specifications of the particulate material could include chlorophyl minimum, protein minimum, fiber maximum, moisture maximum and particle size.

Thus, it is seen that I have provided a composition and process for treating animal waste wherein the latter is successfully rendered odorless, dry and camouflaged by utilization of a single particulate material. Also noteworthy are the economical advantages provided by my composition and process. It will also be appreciated that my invention is particularly advantageous to the domestic pet owner, especially when the animal litter is kept within specified critical particle size ranges.

Having thus described the invention, what is claimed as new and desired to be secured by Letters Patent is:

1. A composition for use as animal litter comprising a particulate, compressed, chlorophyl containing grass material characterized by the properties of readily absorbing liquids, having a color suitable for masking animal wastes deposited in the litter and including a sufficient active quantity of chlorophyl therein to suppress and destroy odors emanating from said wastes.

2. The invention of claim 1, said grass being alfalfa.

3. The invention of claim 2, said particulated alfalfa being in dehydrated granular form.

4. The invention of claim 2, said granulated alfalfa having a particle size of $1/16$ to $1/4$ inch.

5. The invention of claim 4, said material including alkali metal bentonite.

6. The invention of claim 5, the proportion of said bentonite in said material being $1/2$ to 25 percent.

7. The invention of claim 6, said material including 6-ethoxy-1,2-dihydro-2,2,4-trimethylquinoline.

8. A method of preparing an animal litter comprising the steps of:
   pelletizing chlorophyl containing grass material;
   comminuting said pelletized material to produce granules therefrom; and
   adding a liquid absorbing agent to said granules.

9. A method as set forth in claim 8 wherein is included the step of continuing the comminution of said pelletized material until granules are obtained within the range of about $1/16$ inch to approximately $1/4$ inch.

References Cited by the Examiner

UNITED STATES PATENTS

| | | | |
|---|---|---|---|
| 2,014,900 | 9/1935 | Lapp | 119—1 |
| 2,279,405 | 4/1942 | Laughlin | 119—1 |
| 2,470,346 | 5/1949 | Frankenhoff | 119—1 X |
| 2,597,457 | 5/1952 | Cook | 119—1 |
| 2,649,759 | 8/1953 | Gibbs | 119—1 |
| 3,059,615 | 10/1962 | Kuceski et al. | 119—1 |
| 3,125,991 | 3/1964 | Van Dusen | 119—56 |

ALDRICH F. MEDBERY, *Primary Examiner.*